United States Patent [19]

Menon

[11] Patent Number: 4,489,799

[45] Date of Patent: Dec. 25, 1984

[54] WEIGHT MEASURING APPARATUS WITH A DISTRIBUTED ARRAY OF SPRING ELEMENTS

[75] Inventor: Narandranath Menon, Arlington, Tex.

[73] Assignee: General Electrodynamics Corp., Arlington, Tex.

[21] Appl. No.: 496,903

[22] Filed: May 23, 1983

[51] Int. Cl.³ ............................................. G01G 5/04
[52] U.S. Cl. .................................... 177/209; 177/254
[58] Field of Search ............................... 177/209, 254

[56] References Cited

U.S. PATENT DOCUMENTS

| | | |
|---|---|---|
| 2,107,883 | 2/1938 | Benedek . |
| 2,314,011 | 3/1943 | Maurer . |
| 2,886,301 | 5/1959 | Aske . |
| 2,932,501 | 4/1960 | Hicks . |
| 3,191,701 | 6/1965 | Gray . |
| 3,217,818 | 11/1965 | Engelsher et al. ............... 177/209 X |
| 3,464,509 | 9/1969 | Gray . |
| 4,007,800 | 2/1977 | Janach et al. . |

FOREIGN PATENT DOCUMENTS

| | | |
|---|---|---|
| 45852 | 2/1966 | German Democratic Rep. .................................... 177/209 |
| 59173 | 3/1967 | German Democratic Rep. . |

OTHER PUBLICATIONS

*Load O Meter Corporation* brochure on Portable Weighing Devices, "Haenni Scale for Wheel-Loads".

*Primary Examiner*—George H. Miller, Jr.
*Attorney, Agent, or Firm*—Jerry W. Mills; Gregory M. Howison; Nina Medlock

[57] ABSTRACT

A weighing scale (10) includes a base (12) with an array of cylindrical bores (16) disposed therein. A network of interconnecting channels (18) is formed on the lower surface of the base (12) with a cover (20) disposed thereover. A layer of elastically deformable material (22) is disposed on the other side of the base (12) to cover the bores (16). The base (20) and the elastically deformable layer (22) define deformable chambers (24) within the bores (16). A load bearing layer (34) is disposed over the elastically deformable layer (22) and spaced therefrom by spherical members (32) disposed proximate the longitudinal axis of the bores (16). A locating layer (28) positions the spherical members (32) in their proper place. The deformable chambers (24) and the interconnecting channels (18) comprise a common reservoir that is connected to an expanding bellows type gauge (36). The gauge (36) allows for volumetric displacement of fluid within the deformable chambers (24). Weight applied to the load bearing layer (34) results in deformation of the elastically deformable layer (22) and a volumetric displacement of fluid from the deformable chambers (24) to the expanding bellows type gauge (36). Measurement of this volumetric displacement is converted into a weight measurement that can be directly read from the face of the gauge (36).

21 Claims, 6 Drawing Figures

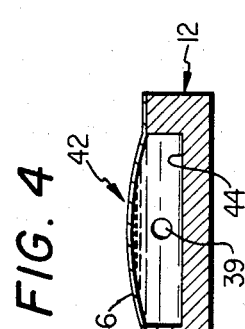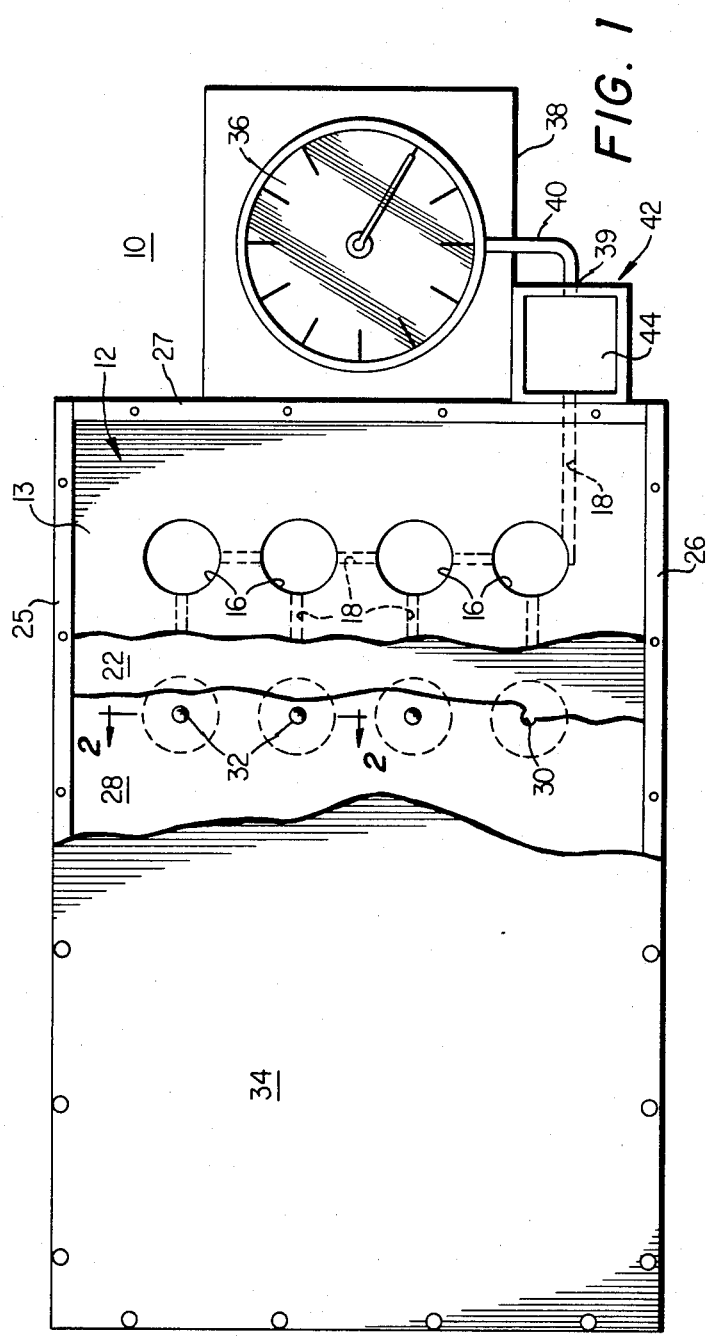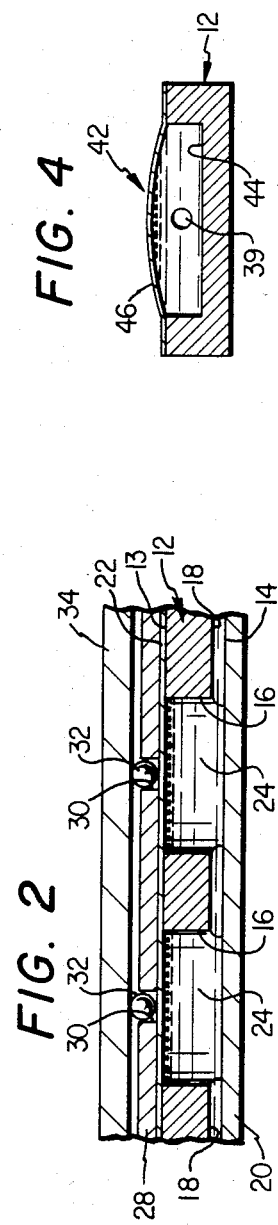

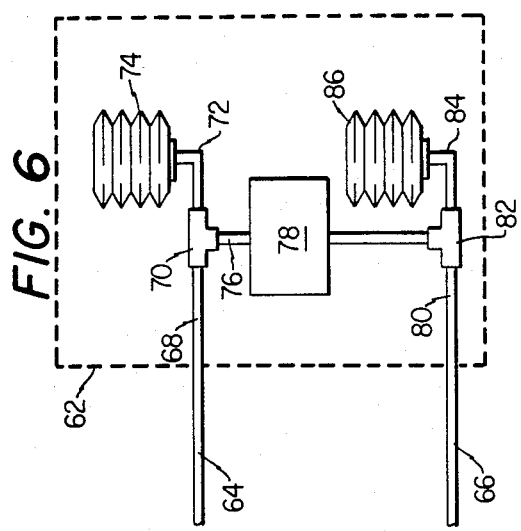
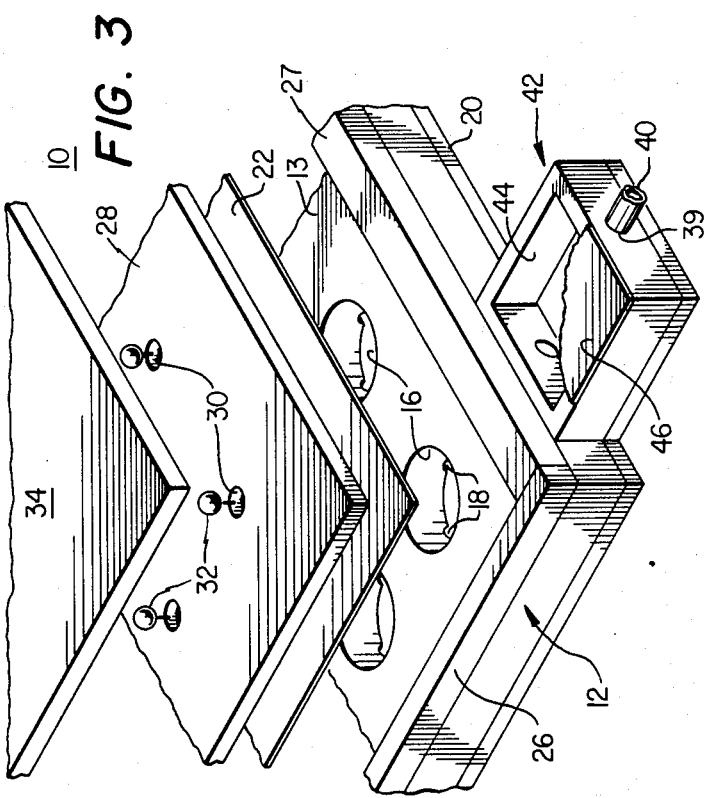
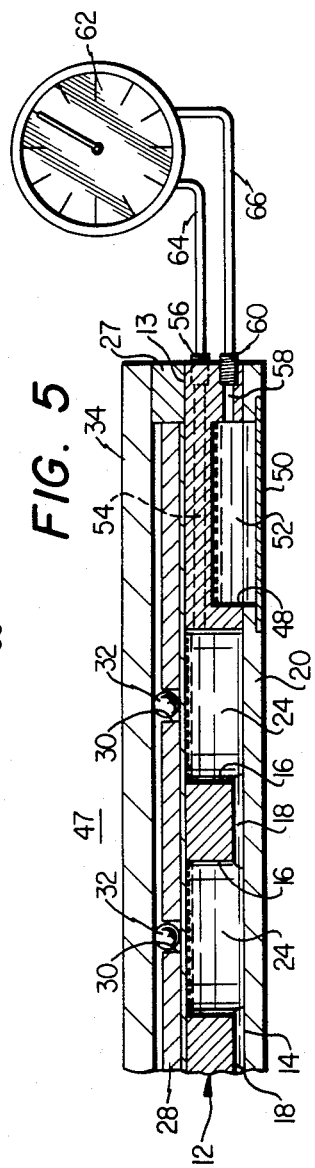

WEIGHT MEASURING APPARATUS WITH A DISTRIBUTED ARRAY OF SPRING ELEMENTS

TECHNICAL FIELD

The present invention pertains in general to weight scales and, more particularly, to portable scales for measuring relatively large loads.

BACKGROUND OF THE INVENTION

Portable scales for use in measuring large loads such as heavy vehicles require that they be relatively light weight with a small size and a low profile. These type of scales are especially useful by state agencies "in the field" to determine if commercial vehicles are operating within allowable load limits. To accomplish the weight measurement, a number of scales are normally placed on the roadway or the shoulder thereof and the vehicle driven thereon such that all of the vehicle's wheels are supported. Under normal circumstances, the scales may be moved to many different locations during the course of a working day and a large number of different vehicles measured.

The environment in which this weight measurement is performed requires reasonably stable temperature characteristics for the scales in order to obtain an accurate measurement. Normally, prior art scales have provided some type of zeroing mechanism to compensate for temperature variations after the scale has stabilized at an ambient temperature. However, this mechanism requires that the scale be allowed to stabilize for some duration of time prior to performing the weight measurement. These types of scales are impractical in a normal working environment since the scale may be removed from one temperature medium and suddenly placed in another temperature medium, such as from the trunk of a car to a concrete road, and be allowed to stabilize for a very short time before making the weight measurement, resulting in substantial inaccuracies.

Previously developed portable scales have utilized some arrangement of springs or hydraulics to measure vehicle weight and still retain some level of portability. In the past, such apparatuses have often been bulky in order to achieve the required degree of accuracy. One device that has provided a relatively small size and low profile is disclosed in U.S. Pat. No. 4,007,800 issued to W. Janach, et al. This scale utilizes a plurality of parallel elliptically shaped hollow spring elements. The spring elements all communicate with a gauge and are filled with a fluid. A plate disposed on top of the spring elements compresses the spring elements when subjected to an external weight. The compression of these spring elements results in a volumetric displacement thereby forcing the fluid therein to be displaced into an external reservoir, which is comprised of an expanding bellows type gauge. The deflection of the bellows is proportional to the deflection of a needle on the gauge. By measuring the volumetric change, the elastic deformation of the spring elements can be converted to a weight measurement.

Although the Janach patent discloses a low profile scale, the use of the elliptical spring elements presents manufacturing and cost problems. This is due to the fact that the elliptical spring elements are essentially tubular members that must be carefully dimensioned and attached to a base on the exterior thereof and then the interiors thereof must be attached to a common channel connecting them to the gauge. In addition, the temperature stability of such previously developed scales has not been completely satisfactory. There thus exists a need for a light weight portable scale with improved accuracy and temperature compensation and that is relatively simple to manufacture.

SUMMARY OF THE INVENTION

The present invention described and claimed herein comprises an apparatus for measuring weight. The apparatus includes a base having a planar upper surface with a plurality of wells formed therein. A network of interconnecting channels is disposed within said base for fluid communication between adjacent ones of said wells. A layer of elastically deformable material is disposed on the planar upper surface of the base and covering the wells. The deformable layer is sealingly attached to the planar surface of the base around the perimeter of the wells. The wells and the portion of the deformable layer disposed thereover define a plurality of deformable chambers. An expandable bellows in fluid communication with the network of channels provides a variable volume to allow for volumetric expansion and contraction of the deformable chambers. The deformable chambers, the channels and the expansion bellows are filled with the fluid to define an overall sealed volume. A load bearing layer is disposed over the deformable layer for concentrating the received weight to the portion of the elastically deformable layer that is proximate the center of each of the wells to deform each of the deformable chambers and cause a volumetric displacement therefrom to the expansion bellows. The fluid displacement between the deformable chambers and the expanding bellows is measured and converted to a weight measurement.

In another embodiment of the present invention, the load bearing layer is comprised of a deformable layer that is spaced from the elastically deformable layer by a plurality of spherical load transferring members. Each of the load transferring members is disposed adjacent the elastically deformable layer proximate the center of an associated one of the wells. All of the spherical members have an essential equal height above the elastically deformable layer such that they are all in contact with the deformable layer.

In yet another embodiment of the present invention, a locating layer is disposed between the deformable load bearing layer and the elastically deformable layer to locate each of the spherical load transferring members. The locating layer has a plurality of orifices disposed therein with the diameter slightly larger than the spherical load transferring members. The orifices are operable to define the relative position of one spherical member with respect to the remaining spherical members and is locatable with respect to each of the wells, thereby spacing all of the spherical members in approximately the same relative position with the associated one of the wells.

In a further embodiment of the present invention, a compensating chamber is attached between the deformable chambers and the expansion bellows to compensate for expansion and contraction of the fluid over temperature. The compensating chamber expands for a corresponding expansion of the fluid as a function of temperature and contracts for a corresponding contraction of the fluid as a function of temperature. This expansion and contraction of the compensating chamber over temperature prevents expansion or contraction of the expansion bellows as a function of temperature.

BRIEF DESCRIPTION OF THE DRAWINGS

For a more complete understanding of the present invention and the advantages thereof, reference is now made to the following description taken in conjunction with the accompanying drawings in which:

FIG. 1 illustrates a planar view of the scale of the present invention with portions thereof cut away to illustrate the various assemblies;

FIG. 2 illustrates a cross-sectional view taken along lines 2—2 of FIG. 1;

FIG. 3 illustrates an exploded view of the embodiment of FIG. 1;

FIG. 4 illustrates a sectional view of the temperature variable sealed volume;

FIG. 5 illustrates a cross-sectional view of another embodiment of the present invention utilizing a differential measuring system; and FIG. 6 illustrates the differential measuring apparatus of the embodiment of FIG. 5.

DETAILED DESCRIPTION OF THE INVENTION

Referring now to FIGS. 1-3, there are illustrated various views of a scale 10 with cutaway portions to illustrate the assemblies therein. Scale 10 includes a rectangular base 12 having an upper planar surface 13 and a lower planar surface 14. An array of cylindrical bores 16 are disposed in the base 12 with the longitudinal axes thereof disposed perpendicular to the lower and upper planar surfaces 13 and 14. The cylindrical bores 16 are open ended such that they provide a passageway from the upper planar surface 13 to the lower planar surface 14.

Interconnecting channels 18 are disposed in the lower planar surface 14 and are rectangular in cross section. The network of interconnecting channels 18 connects the interior of the bores 16 for adjacent ones of the bores 16. It should be noted that the bores 16 are disposed in the base 12 in an array that aligns the bores 16 in rows and columns, that is, in a square matrix. This results in a maximum of four channels 18 connected to each of the bores 16 that are centrally located in the matrix and a minimum of two interconnecting channels 18 connected to a bore 16 that is disposed on the corner of the matrix. It should be understood, however, that it is only necessary to have at least one interconnecting channel such that the interior of all of the bores 16 are in fluid communication with the remaining ones thereof.

A cover 20 is disposed on the lower planar surface 14 of the base 12 to cover the interconnecting channels 18 and one end of the bores 16. A layer of elastically deformable material 22 is disposed over the upper planar surface 13 to cover the other end of the bores 16. Both the cover 20 and the elastically deformable layer 22 are sealingly attached to the respective surfaces of the base 12 by a film adhesive that attaches both around the perimeter of the cylindrical bores 16 and the perimeter of the interconnecting channels 18. This sealing attachment thereby defines a plurality of deformable chambers 24. The channels 18 allow the deformable chambers 24 to communicate as a common reservoir.

Edge borders or spacers 25 and 26 are disposed along the edge of the base 12. An end border or spacer 27 and an end border or spacer (not shown) are attached to the edges of the base 12 on opposite ends thereof.

A locating layer is disposed within the perimeter of the spacers 25, 26, and 27 adjacent the elastic layer 22 and parallel therewith. The locating layer 28 has a plurality of orifices 30 disposed therein and positioned such that the centers thereof are proximate the longitudinal axis of each of the bores 16. A plurality of spherical members 32 are disposed in each of the orifices 30 with each of the spherical members 32 having a diameter larger than the thickness of the locating layer 28.

A load bearing layer 34 is disposed on top of the spherical members 32 with the peripheral edges thereof resting on and secured to the borders 25, 26 and 27. The load bearing layer 34 is operable to distribute a weight applied thereto to the spherical members 32. The borders 25, 26 and 27 function as spacers to support the edges of the load bearing layer 34. Since the spherical members 32 are disposed adjacent the elastically deformable layer 22, weight applied to the load bearing layer 34 is transferred through the spherical members to a point on the elastically deformable layer 22 proximate to the axial center of the deformable chambers 24. This transferred weight results in deformation of the portion of the surface of the elastically deformable layer 22 that covers one end of the deformable chambers 24 resulting in a decrease of the volume therein.

A gauge 36 is disposed in a mounting bracket 38 on one end of the base 12. The gauge 36 communicates with an orifice 39 on the side of the base 12 through a length of tubing 40. The orifice 39 communicates with the interconnecting channels 18 through a temperature variable chamber 42. The temperature variable chamber 42 will be described hereinbelow. The gauge 36, the temperature variable chamber 42 and the connecting tube 40 all comprise part of the sealed volume formed with the deformable chambers 24 and the interconnecting channels 18.

Each of the deformable chambers 24 is filled with a fluid which, in the preferred embodiment, is a relatively incompressible fluid such as hydraulic fluid. However, it should be understood that any suitable fluid can be utilized. The load bearing layer 34 functions as a primary load bearing surface upon which the weight is essentially disposed resulting in a vertical force disposed thereon. The weight on the load bearing layer 34 is transferred to the spherical members 32 at a point tangential thereto. Since the members 32 are spherical, the point disposed adjacent the elastically deformable layer 22 is also at a point tangential to the surface of the spherical members 32. Therefore, the load is distributed to a very small portion of the surface of the elastically deformable layer 22. In this manner, the weight applied to the load bearing layer 34 is essentially distributed to an array of points that are proximate the axial center of each of the deformable chambers 24.

The locating layer 28 is operable, when in position, to dispose all of the spherical members 32 at the same relative position with respect to the associated one of the deformable chambers 24. In this manner, the spherical members 32 associated with one of the deformable chambers 24 will be positioned at essentially the same relative location with respect to the longitudinal axis of an adjacent one of the spherical members 32 and the associated one of the deformable chambers 24. For example, if the locating layer 28 is positioned such that one of the orifices 30 is slightly off center with respect to the longitudinal axis of a deformable chambers 24, the spherical member associated therewith 32 will contact the elastically deformable layer 22 at a position slightly off center to the longitudinal axis of the associated deformable chambers 24. This results in a different elastic constant than if the particular spherical member 32 were located at precisely the longitudinal axis of the associated deformable chamber 24. Since the locating layer 28 positions the remaining ones of the spherical members 32 in a correspondingly off center position, all of the elastic constants for all of the combined deformable chambers 24 and spherical members 32 will be essentially the same. In this manner, the weight transferred from the load bearing layer 34 is more evenly distributed.

The elastically deformable layer 22 can be fabricated from many materials such as aluminum, copper or any elastic material. As long as the force directed onto the elastically deformable layer 22 does not exceed the range of elasticity of that material, the material will return to its normal position, such as that illustrated in FIG. 2. The thickness of the elastically deformable layer 22 for a particular material is determined by the number of deformable chambers 24 and the amount of weight to be distributed therebetween. To reduce the maximum amount of deformation that will occur within the deformable chambers 24, additional deformable chambers 24 can be added to further distribute the weight applied to the load bearing layer 34.

Deformation of the portion of the elastically deformable layer 22 at the opening of the bores 16 results in a decreased volume of fluid disposed in the deformable chambers 24. Since the fluid disposed therein is incompressible, it is necessary to provide an expanding reservoir for the fluid to escape to. This expanding reservoir is inherent in the gauge 36 which is a diaphragm pressure gauge that, in the preferred embodiment, is of the type Model Number 612.20 manufactured by Wika Instruments. This is essentially an expanding bellows-type diaphragm which expands under slight pressure increases. This is also a low pressure gauge which results in a very small back pressure on the fluid. This back pressure is negligible in respect to the amount of force applied to each of the spherical members 32. Therefore, the fluid in the overall sealed volume is essentially held at a constant pressure and the gauge 36 provides a measurement of volumetric displacement between the deformable chambers 24 and the expanding bellows in the gauge 36. It is important to note that the use of a fluid at a relatively constant pressure aids the assembly of the scale 10 in that the difference between the pressure internal to the deformable chambers 24 and that exterior thereof is essentially equal with very minor variations therebetween. Therefore, the bonding agents attaching the elastically deformable layer 22 and the cover 20 to the surfaces of the base 12 does not have to be a high pressure adhesive. It merely has to provide a low pressure seal.

Although an incompressible fluid has been utilized in the deformable chambers 24 in the preferred embodiment, it should be understood that a compressible fluid can also be used therein. It is only necessary to measure the characteristics of this fluid when it is subjected to the deformation of the chambers 24. A preferred characteristic of the fluid disposed in the chambers 24 is that it presents a negligible back pressure thereby allowing the elastic constant of the elastically deformable layer 22 to be unimpeded during deformation.

The load bearing layer 34 should also be fabricated of a deformable material, such as that utilized for the elastically deformable layer 22. In order to distribute the weight to a sufficient number of the spherical members 32, the relative diameter of each of the spherical members 32 with respect to the upper planar surface 13 of the base 12 should not prevent contact between the contacting points of the spherical members 32 and the adjacent surface of the load bearing layer 34. By utilizing a deformable material, a slight diameter variation between two adjacent spherical members 32 can be compensated for. This is due to the fact that a slightly higher resistance will be encountered upon deformation of the chambers 24 with the increased diameter spherical member 32, thereby allowing the portion of the load bearing layer 34 proximate a slightly smaller diameter spherical member 32 to deform until it contacts the slightly smaller diameter spherical member 32. In this manner, the weight is more evenly distributed to a plurality of adjacent spherical members 32 rather than being concentrated on only a select few of the larger diameter spherical members 32. It should be understood that the weight applied to the load bearing layer 34 is not necessarily distributed evenly across all of the spherical members 32 but, rather, may be distributed to only a select few. For example, if the weight were applied to only one corner of the load bearing layer 34, it would only be necessary to concentrate the force in the immediate vicinity of the weight. This is due to the fact that deformation of the elastically deformable layer 22 is designed to remain in a relatively linear elastic range for a given weight. If slightly more weight is concentrated in one area than in another, the thickness of the elastically deformable layer 22 and the diameter of the bores 16 are designed to accommodate this increased weight without substantially reducing the accuracy of the gauge 36.

In the preferred embodiment, the base 12 is dimensioned to be approximately one-half of an inch in thickness. The elastically deformable layer 22 is fabricated from aluminum having a thickness of approximately 1/16th of an inch. The spherical members 32 have a diameter of approximately 0.15 to 0.2 inch. The load bearing layer 34 is also fabricated of aluminum and is dimensioned to have a thickness of approximately ⅛th of an inch. The overall dimensions for the scale 10 are approximately one inch in thickness. If the metal utilized is aluminum, this results in a fairly lightweight and portable scale.

Referring now to FIG. 4, there is illustrated a cross-sectional detailed view of the temperature variable chamber 42. The temperature variable chamber 42 is comprised of a milled rectangular channel 44 disposed in the base 12 and integral therewith. The channel 44 is covered by a layer 46 of bi-metallic material. The bi-metallic layer 46 is comprised of two different layers of temperature expansive material that have different temperature coefficients. The result is that the layer 46 will become concave for a temperature variation in one direction and convex for a temperature variation in the opposite direction. The result is that the volume in the chamber defined by the channel 44 and the layer 46 varies as a function of temperature. For a fluid which expands as temperature increases, the bi-metallic layer forming the layer 46 will be chosen such that the layer 46 becomes convex as temperature increases thereby increasing the volume and maintaining a constant pressure within the overall sealed volume. Since the gauge 36 is operable to measure an increase of volume over that present in the sealed volume defined by the deformable chambers 24, the channels 18, and the gauge 36, the temperature variable chamber 42 essentially varies the overall sealed volume to compensate for increases in the volume of the fluid such that the bellows in the gauge 36 does not expand or contract. In addition, there are some volumetric variations resulting from expansion and contraction of the base 12. These also can be compensated by the temperature variable chamber 42.

Referring now to FIG. 5, there is illustrated a cross-sectional view of a weighing scale 47 which is another embodiment of the scale 10 of FIG. 1 wherein like numerals refer to like parts in the various figures. In the scale 47, a channel 48 is milled on the lower surface 14 of the base 12. The cover 20 is disposed over the channel 48 to define a chamber 52 therein. The volume of the compensating chamber 52 is essentially equal to the total volume of all of the deformable chambers 24 and the channels 18. The compensating chamber 52 is filled with a liquid identical to the liquid in the deformable chambers 24. Therefore, an increase or decrease in volume resulting from temperature variations results in an equal increase or decrease in volume in the compensating chamber 52.

A conduit 54 is disposed in the base 12 connecting an orifice 56 disposed on the outside of the base 12 to the channels 18 to provide fluid communication therebetween. A conduit 58 is disposed in the base 12 connecting an orifice 60 to the compensating chamber 52 to provide fluid communication therebetween. A differential gauge 62 has one of its differential inputs connected to the orifice 56 through a connecting conduit 64 and the other differential input thereof connected to the orifice 60 through a connecting conduit 66. The differential gauge 62 is operable to read the difference in volumetric displacement between the liquid contained in the compensating chamber 52 and the liquid contained in the deformable chambers 24. The differential gauge has expanding bellows interior thereto to provide an expanding reservoir for the volumetric displacement. As described above, a volumetric expansion or contraction of the liquid disposed in the deformable chambers 24 will be compensated by an equal volumetric expansion or contraction, respectively, of the liquid contained in the compensating chamber 52. When weight is applied to the load bearing layer 34, fluid is displaced from the deformable chambers 24 resulting in an additional volumetric displacement that is not compensated by the compensating chamber 52. This difference in volumetric displacement between the two chambers is registered on the differential gauge 62, as will be described hereinbelow.

Referring now to FIG. 6, there is illustrated one embodiment of the differential gauge 62 of FIG. 5. The connecting conduit 64 is input to the differential gauge 62 to connect with a connecting conduit 68. The other end of the connecting conduit 68 is connected to a tee 70. The other end of the tee 70 is connected to one end of a connecting conduit 72. The other end of the connecting conduit 72 is connected to an expandable diaphragm or bellows 74. The tee 70 is also connected through a conduit 76 to a transducer 78. The connecting conduit 66 that communicates with the compensating chamber 52 is input to the differential gauge 62 through a connecting conduit 80. The connecting conduit 80 has the other end thereof connected to a tee 82. The other end of the tee 82 is connected to one end of a connecting conduit 84. The other end of the connecting conduit 84 is connected to an expanding diaphragm or bellows 86.

The expanding diaphragms or bellows 74 and 86 are essentially identical to the gauge 36 of FIG. 1. The internal mechanism of the gauge 36 is essentially an expandable diaphragm or bellows. These bellows expand upon pressure exerted on the fluid. Since this gauge 36 is a low pressure gauge, a pressure increase is required to expand the internal bellows in the gauge 36. Although the differential gauge 62 is illustrated using expanding bellows, it should be understood that other assemblies may be used. For example, inverted U-tubes can be utilized wherein the increasing head pressure resulting from volumetric expansion creates a slight negative back pressure.

The difference in the slight negative back pressure resulting from the expansion of the bellows 74 and 86 is measured by the transducer 78. The transducer 78 is of a differential type manufactured by Ametek Controls Division Model No. 55AD001A. As long as the volumetric displacement is equal in both connecting conduits 64 and 66, the differential pressure registered on transducer 78 will be zero. However, when the pressure in connecting conduit 68 increases over that in connecting conduit 66, the transducer 78 will register a differential pressure therebetween. This differential pressure is proportional to the weight applied to the load bearing layer 34. However, it should be emphasized that the variations in pressure within both the deformable chambers 24 and the compensating chamber 52 results in only negligable variations in the deformation of the chambers 24.

In summary, there is provided a weight scale that utilizes a layer of elastically deformable material disposed over an array of wells formed in a rectangular base. A network of interconnecting channels connects the array of wells together to form a common reservoir. The elastically deformable layer covering the wells forms an array of deformable chambers in the base. This common reservoir is attached to an expanding bellows -type gauge for measuring volumetric displacement of the fluid that is disposed in the deformable chambers. A load bearing layer is spaced from the elastically deformable layer by a plurality of spherical members. Each of the spherical members is disposed proximate to the center of each of the wells such that deformation of that portion of the deformable layer adjacent the wells occurs when weight is applied to the load bearing layer. Applied weight results in deformation of the deformable chamber, thereby causing a volumetric displacement of fluid from the deformable chambers into the expanding bellows. Measurement of this volumetric displacement is converted to a weight measurement.

Although the preferred embodiment has been described in detail, it should be understood that various changes, substitutions and alterations can be made therein without departing from the spirit and scope of the invention as defined by the appended claims.

What is claimed is:

1. An apparatus for measuring weight, comprising:
 a base having an upper planar surface;
 a plurality of wells formed in the planar surface of said base;
 channel means for fluid communication with all of said wells;
 a layer of elastically deformable material disposed on the upper planar surface of said base and covering said wells, said deformable layer sealingly attached to the planar surface of said base around the perimeter of said wells, said wells and the portion of said deformable layer disposed thereover defining a plurality of deformable chambers;

said deformable chambers and said channel means filled with a fluid;

means for receiving the weight to be measured and distributing and concentrating the received weight to the portion of said deformable layer proximate the center of each of said wells, said receiving means deforming each of said deformable chambers to cause a volumetric displacement therefrom to said expansion means; and means for measuring a physical characteristic of said fluid in said deformable chambers as a function of the deformation of said deformable chambers resulting from the weight applied to said receiving means and converting the measured physical characteristics into a measurement of the weight received.

2. The apparatus of claim 1 wherein said fluid is essentially incompressible.

3. The apparatus of claim 1 wherein said channel means comprises:

a plurality of interconnecting channels disposed in the undersurface of said base diametrically opposite said planar upper surface, said interconnecting channels providing fluid communication between adjacent ones of said wells; and a cover sealingly attached to the undersurface of said base and covering said interconnecting channels to provide a cover therefor.

4. The apparatus of claim 1 wherein said wells are arranged in an ordered array.

5. The apparatus of claim 1 wherein said means for receiving comprises:

a spacer layer having a plurality of locating orifices disposed therein, each of said locating orifices disposed proximate the center of an associated one of each of said wells;

load transferring members disposed in said locating orifices and proximate the surface of said deformable layer, said load transferring member having a dimension perpendicular to said deformable layer greater than the thickness of said spacer layer; and a load bearing layer disposed over said spacer layer and in contact with essentially all of said load transferring members for receiving the weight to be measured and distributed the received weight to said load transferring members such that said load transferring members deform said deformable chambers.

6. The apparatus of claim 5 wherein said load transferring members have an essentially spherical shape.

7. The apparatus of claim 5 wherein said load bearing layer is fabricated from a deformable material.

8. The apparatus of claim 1 further comprising compensating means for compensating temperature related volumetric changes of said liquid contained in said sealed chamber.

9. The apparatus of claim 8 wherein said compensating means comprises a temperature variable sealed chamber in communication with said channel means, said temperature variable chamber having a volume that expands for a temperature variation in a first direction to prevent temperature expansion of said fluid causing a volumetric displacement into said expansion means and said temperature variable volume contracting in the opposite temperature direction to prevent a corresponding temperature related contraction of said fluid from causing a temperature related volumetric displacement in said expansion means.

10. An apparatus for measuring weight, comprising:

a base having a planar upper and lower surface;

a plurality of open cavities formed in said base having an opening on both the upper and lower surfaces of said base;

a plurality of interconnecting channels disposed in the lower surface of said base for interconnecting adjacent ones of said cavities;

a layer of nondeformable material disposed over the lower planar surface of said base and covering said cavities and said interconnecting channels, said nondeformable layer sealingly attached thereto;

a layer of elastically deformable material disposed on the upper planar surface of said base covering said cavities, said deformable layer sealingly attached around the perimeter of the opening of each of said cavities in the upper planar surface of said base;

each of said cavities, said deformable layer and said nondeformable layer defining a deformable chamber, the volume of which can be altered by deforming said deformable layer adjacent the associated one of said cavities;

said deformable chambers and said interconnecting channels filled with a fluid;

expansion means in fluid communication with said interconnecting channels for allowing volumetric displacement of said fluid in said deformable chambers on deformation of said deformable chambers;

a load bearing layer disposed proximate to said deformable layer in a plane parallel therewith, said load bearing layer for receiving the weight to be measured;

a plurality of spherical load transferring members disposed between said load bearing layer and said deformable layer, each of said load transferring members disposed proximate the center of one of said cavities for transferring force from said load bearing layer to a portion of said deformable layer proximate the center of the associated one of said cavities such that weight received by said load bearing layer is concentrated and transferred to deform the portion of said elastic layer covering the associated one of said cavities;

locating means for spacing said load transferring members a predetermined distance apart from adjacent ones of said load transferring members between said deformable layer and said load bearing layer; and gauge means for measuring volumetric displacement between said deformable chambers and said expansion means, the displacement therebetween proportional to the deformation of the portion of said deformable layer adjacent each of said cavities to indicate weight.

11. The apparatus of claim 10 wherein each of said cavities comprises a cylindrically shaped bore disposed through said base and perpendicular to said upper and lower surfaces and open on each of said surfaces.

12. The apparatus of claim 10 wherein said cavities are arranged in an ordered array.

13. The apparatus of claim 10 wherein said interconnecting channels have a rectangular cross section.

14. The apparatus of claim 10 wherein said fluid is incompressible.

15. The apparatus of claim 10 wherein said expansion means comprises an expandable bellows in fluid communication with said interconnecting channels.

16. The apparatus of claim 10 wherein said load bearing layer is fabricated from a deformable material such that the surface of said load bearing layer is disposed adjacent said spherical load transferring members contacts essentially all of said load transferring members to compensate for irregularities in the diameters of said load transferring members.

17. The apparatus of claim 10 further comprising means for compensating temperature related volumetric changes in said fluid.

18. The apparatus of claim 17 wherein said compensating means comprises a temperature variable sealed volume connected between said expansion means and said deformable chambers for expanding and contracting with temperature variations with a corresponding temperature related expansion and contraction of said fluid to prevent said expansion means from expanding or contracting as a function of temperature.

19. The apparatus of claim 17 wherein said compensating means comprises:
- a compensating sealed chamber having an essentially nondeformable boundary surface;
- said compensating chamber having a volume essentially equal to the total volume of said deformable chambers formed by said cavities, said deformable layer and said base with said deformable layer in the nondeformed state;
- said compensating chamber having said fluid disposed therein;
- compensating expansion means in fluid communication with said compensating chamber to allow for expansion and contraction thereof; and
- said gauge means comprising a differential gauge for measuring the differential volumetric change of the fluid between said deformable chambers and said expansion means with respect to the volume of fluid in said compensating chamber and said compensation expansion means wherein the volumetric change of said fluid in said deformable chambers and said expansion means results in an essentially equal volumetric change in said compensating chamber and said compensation expansion means such that a temperature related expansion or contraction of the liquid in said deformable chamber is compensated by an essentially equal temperature related contraction or expansion, respectively, of the fluid in said compensating chamber wherein only the differential volumetric change is indicative of weight measurement.

20. An apparatus for measuring weight, comprising:
- a rectangular base having a planar upper and lower surface;
- a plurality of cylindrically shaped bores disposed through said base at right angles to the upper and lower planar surfaces thereof, said bore open ended at both the upper and lower planar surfaces of said base;
- a plurality of interconnecting channels with a rectangular cross section disposed in the lower planar surface of said base for interconnecting the interior of adjacent ones of said bores;
- a cover disposed over the lower planar surface of said base covering one end of said bores and said interconnecting channels;
- an elastically deformable layer of material disposed over the upper planar surface of said base and covering the other end of said bores, said bores, said deformable layer and said base defining a plurality of deformable chambers;
- an incompressible fluid disposed in said interconnecting channels and said deformable chambers;
- an expandable bellows in fluid communication with said channels for allowing volumetric displacement of said fluid in said deformable chambers;
- a plurality of spherical members disposed on said deformable layer, each of said spherical members associated with one of said deformable chambers and disposed proximate the longitudinal axis of said deformable chambers;
- a locating layer having a plurality of orifices disposed therein, said orifices dimensioned to allow such spherical members to insert therethrough, said locating layer disposed adjacent said deformable layer and having a thickness less than the diameter of said spherical members;
- a load bearing layer disposed on said spherical members for receiving the weight to be measured, said load bearing layer deformable to equally distribute the weight to a plurality of said deformable chambers to deform said deformable chambers such that the volume of said deformable chambers is altered resulting in a volumetric displacement between said deformable chambers and said bellows;
- a gauge for measuring weight as a function of volumetric displacement from said deformable chambers to said bellows; and
- compensating means for compensating temperature related volumetric expansion and contractions of said fluid.

21. The apparatus of claim 20 wherein said compensating means comprises a temperature variable sealed volume connected between said bellows and said deformable chambers to provide a compensating volumetric expansion for a corresponding volumetric expansion of said fluid with respect to temperature and to provide a compensating volumetric contraction for a corresponding volumetric contraction of said fluid with respect to temperature such that essentially zero displacement is achieved between said deformable chambers and said bellows over temperature.

* * * * *